(12) United States Patent
Shuman et al.

(10) Patent No.: US 12,279,210 B2
(45) Date of Patent: Apr. 15, 2025

(54) ROADSIDE UNIT MESSAGE TRANSMISSION MANAGEMENT

(71) Applicant: QUALCOMM Incorporated, San Diego, CA (US)

(72) Inventors: Mohammed Ataur Rahman Shuman, San Diego, CA (US); Amit Goel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/455,582

(22) Filed: Nov. 18, 2021

(65) Prior Publication Data

US 2023/0156621 A1 May 18, 2023

(51) Int. Cl.
*H04W 52/28* (2009.01)
*H04W 4/40* (2018.01)
*G08G 1/01* (2006.01)

(52) U.S. Cl.
CPC ........... *H04W 52/285* (2013.01); *H04W 4/40* (2018.02); *G08G 1/0116* (2013.01)

(58) Field of Classification Search
CPC ............. H04W 52/00–60; H04W 4/40; H04W 52/285; G08G 1/0116
See application file for complete search history.

(56) References Cited

U.S. PATENT DOCUMENTS

| | | | |
|---|---|---|---|
| 10,541,738 B1 | 1/2020 | Harel et al. | |
| 11,014,555 B1* | 5/2021 | Beauchamp | H04W 4/023 |
| 2013/0279695 A1 | 10/2013 | Rubin et al. | |
| 2018/0240762 A1* | 8/2018 | Kamgaing | H01L 23/66 |
| 2018/0357897 A1* | 12/2018 | Weinfield | G08G 1/096758 |
| 2019/0373609 A1 | 12/2019 | Kim | |
| 2020/0037131 A1* | 1/2020 | Hieu Nguyen | H04W 16/28 |
| 2020/0162879 A1* | 5/2020 | Lotfallah | H04W 76/18 |

(Continued)

FOREIGN PATENT DOCUMENTS

| | | |
|---|---|---|
| DE | 102013227144 A1 | 12/2014 |
| WO | 2020096693 A1 | 5/2020 |
| WO | 2020165727 A1 | 8/2020 |

OTHER PUBLICATIONS

International Search Report and Written Opinion—PCT/US2022/044847—ISA/EPO—Dec. 21, 2022 13 pages.

*Primary Examiner* — Raymond S Dean
(74) *Attorney, Agent, or Firm* — Muncy, Geissler, Olds & Lowe, P.C.

(57) ABSTRACT

Various embodiments include method performed by a processor of a roadside unit (RSU) processing system for controlling a message transmissions. In various embodiments, the RSU processing system may receive vehicle-to-everything (V2X) information from a vehicle, determine, based on the received V2X information, a minimum reception distance at which the vehicle or operator of the vehicle will reliably receive a message from the RSU and have time for the vehicle to react to the message, determine a transmission power level based on the determined minimum reception distance, and transmit the message to the vehicle using the determined transmission power level. In various embodiments, the RSU processing system may determine the transmission power level taking into account vehicle speeds, vehicle locations, road conditions, weather conditions and/or the type of message being transmitted.

28 Claims, 7 Drawing Sheets

(56) References Cited

U.S. PATENT DOCUMENTS

| | | | | |
|---|---|---|---|---|
| 2020/0342760 | A1* | 10/2020 | Vassilovski | G08G 1/161 |
| 2021/0112388 | A1* | 4/2021 | Rosales | G08G 1/202 |
| 2021/0160849 | A1* | 5/2021 | Sun | H04W 72/23 |
| 2021/0250118 | A1* | 8/2021 | Roth-Mandutz | H04W 72/56 |
| 2021/0314750 | A1* | 10/2021 | Nguyen | H04W 72/20 |
| 2022/0159583 | A1* | 5/2022 | Wang | H04L 5/0051 |

* cited by examiner

ROADSIDE UNIT MESSAGE TRANSMISSION MANAGEMENT

BACKGROUND

Vehicle-to-everything (V2X) technologies (e.g., C-V2X, DSRC) enable vehicles to communicate with each other and everything around them. V2X enables vehicles to broadcast safety messages, such as basic safety messages (BSM) or cooperative awareness messages (CAM), to other V2X enabled vehicles. In addition, roadside units (RSUs) play an important role in enabling traffic safety by transmitting messages to and receiving message from the V2X-equipped vehicles within range. RSUs send various messages for reception by V2X enabled vehicles, including Road Safety Messages (RSMs), Traveler Information Messages (TIMs), Signaling Phase and Time (SPAT) messages, and mapping information. Such messages are used primarily for intelligent transport system (ITS) to distribute road hazard/work warnings, curve speed warnings, and probe data collection. Currently RSUs use fixed transmission power and antenna settings to transmit different types of V2X messages. Thus, all transmitted V2X messages will have the same reception range.

SUMMARY

Various aspects include methods of controlling V2X message transmissions performed by a roadside unit processing system, such as a V2X processing device. Various aspects may include receiving vehicle-to-everything (V2X) information from a vehicle, determining, based on the received V2X information, a minimum reception distance at which the vehicle or operator of the vehicle will reliably receive a message from the RSU and have time for the vehicle to react to the message, determining a transmission power level based on the determined minimum reception distance, and transmitting the message to the vehicle using the determined transmission power level.

Some aspects may further include determining an extent to which road conditions are likely to affect the minimum reception distance, in which determining the minimum reception distance may take into account the determined extent to which road conditions are likely to affect the minimum reception distance. Some aspects may further include determining an extent to which weather conditions are likely to affect the minimum reception distance, in which determining the minimum reception distance may take into account the determined extent to which road conditions are likely to affect the minimum reception distance. Some aspects may further include determining an extent to which a nature of the message is likely to affect the minimum reception distance, in which determining the minimum reception distance may take into account the determined extent to which the nature of the message is likely to affect the minimum reception distance.

In some aspects, transmitting the message using the determined transmission power level may include an omni-directional transmission of the message. Some aspects may further include determining a direction from the RSU to a location at which the vehicle will reliably receive the message at the minimum reception distance, in which transmitting the message using the determined transmission power level may include a directional transmission of the message in the determined direction.

Some aspects may further include determining whether the vehicle is supposed to receive the message, in which the determined transmission power level is a lowest available transmission power level in response to determining that the vehicle is not supposed to receive the message.

Further aspects include an RSU processing system including a memory and a processor configured to perform operations of any of the methods summarized above. Further aspects may include an RSU processing system having various means for performing functions corresponding to any of the methods summarized above. Further aspects may include a non-transitory processor-readable storage medium having stored thereon processor-executable instructions configured to cause a processor of an RSU processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
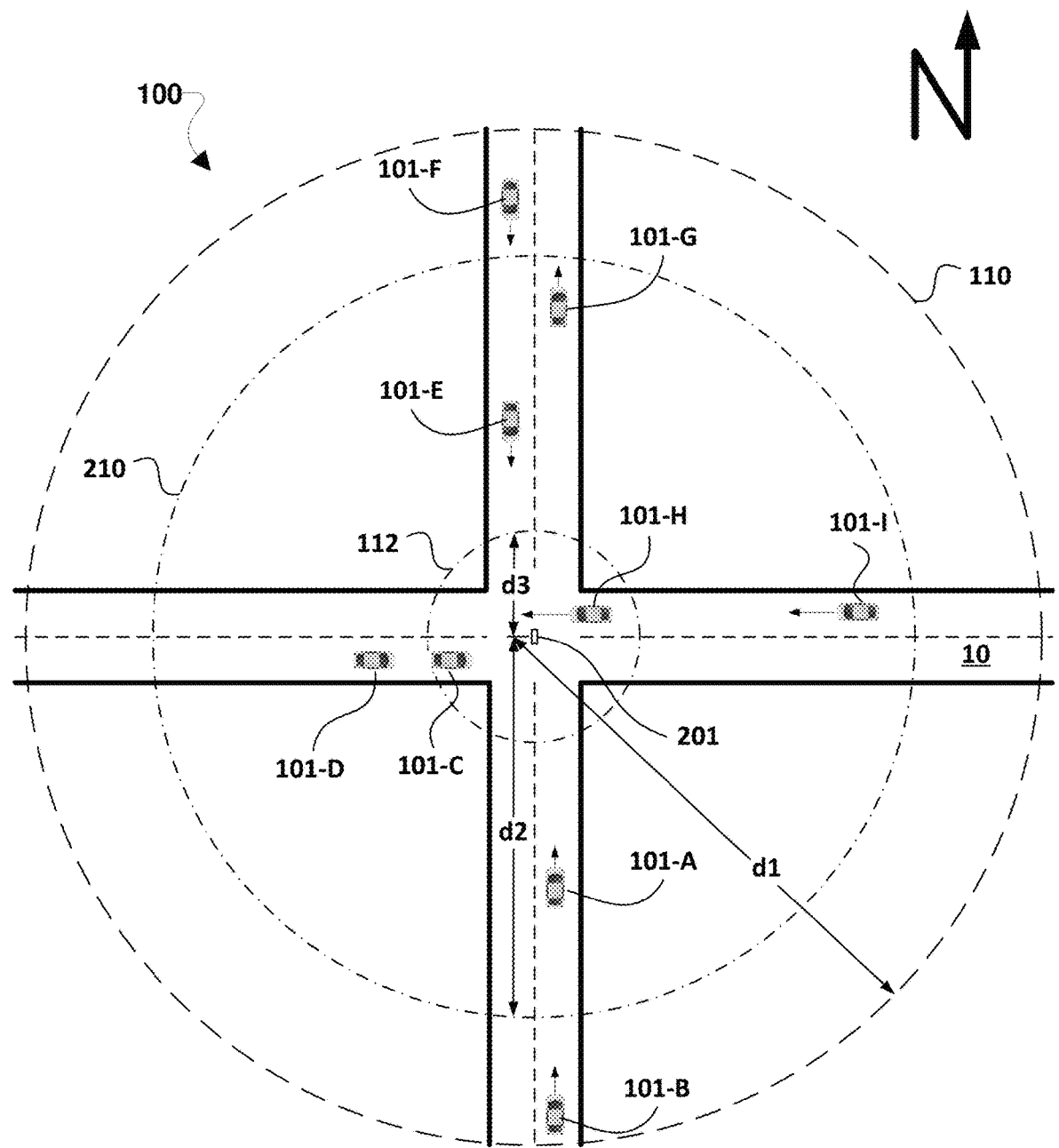
FIG. 1A is a graphical representation of a traffic environment that includes a roadside unit transmitting dynamic omni-directional signaling suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As noted above, RSUs transmit a variety of messages for reception by V2X enabled vehicles, including for example Road Safety Messages (RSMs), Traveler Information Messages (TIMs), Signaling Phase and Time (SPAT) messages, and mapping information. Such messages are used primarily for intelligent transport system (ITS) to distribute information about the roadway and traffic signals, including road hazard/work warnings, curve speed warnings, and probe data collection. A processor with the onboard equipment of V2X enabled vehicles may use information transmitted by RSUs in SPAT messages to determine Green Light Optimized Speed Advisories (GLOSA) for drivers, as well as time-to-red (TTR), time-to-green (TTG), and time-to-yellow (TTY) information.

Various embodiments include methods, devices, and systems for RSUs configured to control the transmission characteristics (e.g., power and directionality) of vehicle V2X messages to improve reception by vehicles that should receive the messages in a manner that reduces message traffic. For example, when vehicles are approaching a traffic light, information about when that traffic light will turn red provided in a SPAT message may not be relevant to a vehicle until that vehicle is within a certain range of the traffic light. In such a case, an RSU implementing various embodiments may perform dynamic range control by limiting transmission power for SPAT messages so that vehicles will reliably receive the SPAT message at least when reaching a minimum reception distance from the RSU that provides the vehicle sufficient time to calculate and react to TTR information. An RSU may determine a SPAT message transmit power level dynamically by calculating the minimum reception distance and using a transmission power level based on the determined minimum reception distance.

In some embodiments, the RSU may determine an extent to which road conditions (e.g., asphalt, concrete, gravel, etc.) are likely to affect the stopping distance that vehicles will need at various speeds, in which case determining the minimum reception distance may take into account the determined extent to which road conditions are likely to affect the minimum reception distance.

In some embodiments, the RSU may determine an extent to which weather conditions (e.g., rain, snow, ice, etc.) are likely to affect the minimum stopping distance that vehicles will need at various speeds as well as signal attenuation effects of weather, in which case determining the minimum reception distance may take into account the determined extent to which road conditions are likely to affect the minimum reception distance.

In some embodiments, the RSU may determine an extent to which a nature of the message is likely to affect the minimum reception distance to provide vehicles and vehicle operators sufficient time to react safely, in which case determining the minimum reception distance may take into account the determined extent to which the nature of the message is likely to affect the minimum reception distance.

In some embodiments, the RSU may determine a direction from the RSU to a location at which the vehicle will reliably receive the message at the minimum reception distance, in which case transmitting the message using the determined transmission power level may use a directional transmission of the message in the determined direction.

In some embodiments, the RSU may determine whether the vehicle is supposed to receive the message, in which case the determined transmission power level may be a lowest available transmission power level in response to determining that the vehicle is not supposed to receive the message.

In some embodiments, RSUs may be configured to implement dynamic range control for certain messages based on traffic conditions. For example, when traffic is slow (e.g., in a traffic jam), vehicles will have more time to calculate and react to GLOSA, TTR, or TTG determinations in all directions from a traffic signal, and therefore RSUs may reduce the transmit power for SPAT messages that provide the information necessary for onboard equipment to make these time determinations. While reducing the transmit power of SPAT messages reduces the distance from a signal at which the messages can be received by V2X enabled vehicles, thereby shortening the reception range of such messages, the slow traffic means that vehicles do not need much time to stop. Conversely, if traffic is moving fast, the RSUs may increase the transmit power for SPAT messages, thereby increasing the reception range so that fast vehicles can determine GLOSA, TTR and TTY information in time to stop for a red line. The RSUs may use messages received from vehicles to estimate the average speed of the traffic and determine the appropriate transmission power for SPAT messages. In addition, RSUs may be configured to use other sensors, such as cameras, to estimate the distance to vehicles and vehicle speeds.

In some embodiments, RSUs may use dynamic range control (i.e., adjusting the transmit power) for transmitting SPAT and other types of messages based on messages received from vehicles. Since vehicle transmit messages, such as BSMs, regularly (e.g., 100/msec), those messages provide information about the transmitting vehicle's location, speed, and direction, which the RSU can use to calculate the transmission power needed to reach that vehicle for a specific message. Further, using BSMs received from vehicles approaching a traffic signal where the RSU may be located, the RSU can select a transmission power for SPAT messages with less range than the range of the received messages since the vehicle is approaching the RSU.

In some embodiments, in case of emergency messages when the RSU is using directional antennas and/or dynamic range control, the RSU may remove restrictions from directional antennas and/or increase the transmit power to reach greater distances, thus transmitting to a broader range of vehicles. However, the required range and direction are not the same for all the V2X messages sent from the RSUs to Vehicles. For example, information regarding the timing of a traffic signal is only relevant to vehicles that are within a block or so of the RSU, thus transmitting SPAT messages with power that enables reception a mile or more away merely adds irrelevant messages to the message volume on the ITS channel for distant vehicles.

In various embodiments, RSUs may use directional antennas to restrict or limit message transmission so that vehicles only receive relevant messages, avoiding irrelevant messages being received by other vehicles and thus reducing ITS channel congestion and conserving power. For example, when RSUs send roadwork warnings to reduce speed for work being done on a shoulder, the vehicles on an opposite side of the road from the roadwork need not receive such warnings, so the RSUs may use directional antennas to send such messages to vehicles on the same side of the road as the construction.

As used herein, "vehicle" refers generally to a sender and/or receiver of V2X messages in an ITS, for example, a car, truck, bus, train, boat, pedestrian, bicycle, motorcycle, scooter, any other type of ITS station, or any other suitable ITS participant type.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

Communication protocol standards are being developed in multiple regions of the world for vehicle-based communication systems and functionality, such as the standards developed in Institute of IEEE and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc.

V2X systems and technologies hold great promise for improving traffic flows and vehicle safety by enabling vehicles to share information regarding their location, speed, direction of travel, braking, and other factors that may be useful to other vehicles for anti-collision and other safety functions. An element of V2X systems is the ability for a vehicle to broadcast V2X information in a V2X message, such as a Basic Safety Messages (BSM) or a Cooperative Awareness Messages (CAM) in Europe, which other vehicles can receive and process to improve traffic safety. A vehicle may transmit a V2X message frequently, in some implementations up to 10 times per second. With most or all vehicles transmitting V2X information, receiving vehicles may receive information from other vehicles to control their own speed, direction, maneuvering, path planning, etc. to avoid collisions and efficiently and safely position vehicles with respect to each other. Further, V2X equipped vehicles may improve traffic flow by safely reducing separation distances, platooning several vehicles together, and avoiding vehicles experiencing breakdowns.

For ease of reference, some of the embodiments are described in this application with reference to an RSU using a particular V2X system, device, and/or and protocol. However, it should be understood that various embodiments encompass any or all of the V2X or vehicle-based communication standards, devices, messages, protocols, and/or technologies. The processing of such messages in the RSU may be performed by a processor or processing system of equipment onboard the vehicle that provides the V2X functionality (referred to herein as an "RSU processing system").

As such, nothing in the application should be construed to limit the claims to a particular system (e.g., V2X) or message or messaging protocol (e.g., BSM or CAM) unless expressly recited as such in the claims. In addition, the embodiments described herein may refer to a V2X processing system in an RSU. Other embodiments are contemplated in which the V2X processing system may operate in or be included in mobile devices, mobile computers, vehicles, and other devices that are equipped to monitor road and vehicle conditions and to participate in V2X communications.

Various embodiments may be implemented within a variety of adaptive traffic management systems and particularly roadside units configured to transmit messages to individual vehicles using dynamic range control. An example adaptive traffic management system 100 is illustrated in FIG. 1A. With reference to FIG. 1A, the adaptive traffic management system 100 may include an RSU 201 configured to dynamically determine transmit power levels by taking into account the needs of the vehicles 101-A to 101-I on the nearby roadway 10.

In FIG. 1A, the RSU 201 may be coupled to or incorporated into a traffic signal, such as those that hang in or near an intersection of a roadway 10. Several vehicles 101-A to 101-I are illustrated in various stages of approaching, passing through, or leaving the intersection from different directions. RSUs 201 may play an important role in improving the safety of the vehicles 101-A to 101-I on the nearby roadway 10. In particular, the RSU 201 may transmit messages to and receive messages from V2X-equipped vehicles 101-A to 101-I within range. For example, the RSU 201 may send road safety messages (RSMs) and/or traveler information messages (TIMs). RSMs and TIMs may include road work warnings, road condition warnings (e.g., roadwork ahead, curve speed warnings, animal crossings, icy roads, flash flood warnings, etc.), SPAT messages, map information and/or probe data collection. The vehicles 101-A to 101-I may be configured to use information within RSU messages, such as providing the driver with a Green Light Optimized Speed Advisory (GLOSA), and/or adjusting speed in autonomous and semi-autonomous operating modes as the vehicles approach an intersection.

The vehicles 101-A to 101-I may not all be able to benefit from a particular message or may not benefit at the same time. For example, a SPAT message regarding timing of traffic signals in an intersection associated with the 201 may be useless to the vehicle 101-G, which is northbound and has already passed the intersection. In contrast, the vehicle 101-I, which is westbound and quickly approaching the intersection could benefit from the knowledge that the light is about to change, enabling the vehicle to prepare to stop. Some vehicles, such as the vehicle 101-B, may not yet need the SPAT message because the vehicle 101-B is too far away from the intersection to be concerned with calculating TTR, TTY or TTG information. However, once the vehicle 101-B approaches the intersection, the SPAT message may be useful for generating a GLOSA and/or calculating TTR, TTY and/or TTG information. Similarly, a roadwork warning message may only impact the northbound and/or southbound vehicles, which means the westbound and/or eastbound vehicles need not receive the messages.

By controlling the power level and/or direction of the transmission of messages, the RSU 201 may conserve energy and avoid flooding all nearby vehicles with messages, including vehicles that do not need the messages or do not yet need them. The RSU 210 in accordance with various embodiments need not use the same range and direction for all vehicle messaging.

V2X-equipped vehicles 101-A to 101-I may share V2X information with the RSU 201. Such V2X information may include vehicle location, speed, direction, behavior such as braking, and/or other information. By sharing the vehicle location, speed, direction, behavior, and/or other information with other vehicles and the RSU, V2X-equipped vehicles can maintain safe separation, identify or avoid potential collisions, and operate more efficiently on the roadway 10. The vehicles 101-A to 101-I may transmit such messages to the RSU 201 when the vehicles reach a predetermined distance, such as a first distance d1 from the RSU 201, shown as circle 110.

A processor of the RSU 201 may determine, based on the received V2X information, a minimum reception distance at which a vehicle transmitting the received V2X information or an operator thereof will reliably receive a message from the RSU 201 and have time for the associated vehicle to use and react to SPAT messages. For example, vehicle 101-F may not be able to act on information within a SPAT message until reaching the second distance d2. Thus, in accordance with various embodiments, the RSU 201 may use the V2X information received from the vehicle 101-F to determine that the second distance d2 is a minimum reception distance at which vehicle 101-F or operator of vehicle 101-F will reliably receive the SPAT message from the RSU 201 and have time for the vehicle 101-F to react thereto. Thereafter, the processor of the RSU 201 may determine a transmission power level for transmitting the SPAT message based on the determined minimum reception distance and transmit the message accordingly. The processor of the RSU 201 may use a lookup table that translates distances to transmission power levels.

In various embodiments, an RSU transmitting messages at varying transmission power levels may use an omnidirectional antenna configured to radiate equal radio power in all directions. In this way, one transmission power level may be used for all vehicles within range of the RSU 201 in all directions. Thus, the determination of the minimum reception distance may be the greatest minimum reception distance determined for all the vehicles 101-A to 101-I to ensure the vehicle needing the information within the RSU message, such as the vehicle requiring greatest minimum reception distance to receive a SPAT message, calculate the TTR and stop if necessary, receives the message in time to react safely.

In some embodiments, a processor of the RSU 201 may further determine an extent to which road conditions are likely to affect the minimum reception distance at which a vehicle associated with the received V2X information or an operator thereof will reliably receive a message from the RSU 201 and have time for the associated vehicle to react to the message. For example, if vehicle traction is reduced from loose material (e.g., gravel, sand, etc.) or from ice or precipitation on the roadway 10, vehicles may need more time to react to messages. To address this, the RSU may determine the minimum reception distance (e.g., for SPAT messages) taking into account the determined extent to which road conditions are likely to affect the minimum stopping distance of vehicles.

In some embodiments, a processor of the RSU 201 may further determine an extent to which weather conditions are likely to affect the minimum reception distance at which a vehicle associated with the received V2X information or an operator thereof will reliably receive a message from the RSU 201 and have time for the associated vehicle to react to a SPAT message. For example, if inclement weather may impact the attenuation of wireless transmissions and/or impact visibility of a driver, vehicles may need to receive messages under those conditions earlier. In this way, determining the minimum reception distance may take into account the determined extent to which weather conditions are likely to affect the reception distance of RSU messages.

In some embodiments, a processor of the RSU 201 may further determine an extent to which a nature of the message affects the minimum reception distance at which a vehicle associated with the received V2X information or an operator thereof will reliably receive a message from the RSU 201 and have time for the associated vehicle to react to the message. For example, if the vehicle 101-G were the only vehicle on the roadway 10, a SPAT message may be irrelevant to that vehicle, since the vehicle 101-G has already passed the intersection. Similarly, based on the vehicle 101-H's close proximity to the center of the intersection, such as less than a third distance d3 from the RSU 201 or within the range 112, such messages may be irrelevant to that vehicle. Based on this determination, a processor of the RSU 201 may not transmit such a message or transmit the message at a lowest possible transmit power level. In this way, the RSU may take into account the nature of the message in determining the minimum reception distance. As another example, if the message relates to an emergency or high risk condition, the minimum reception distance and corresponding transmit power determined by the RSU may be higher. In contrast, if the message relates to a low-risk or non-safety critical advisory, the minimum reception distance and corresponding transmit power determined by the RSU may be lower.

Figure 1B:
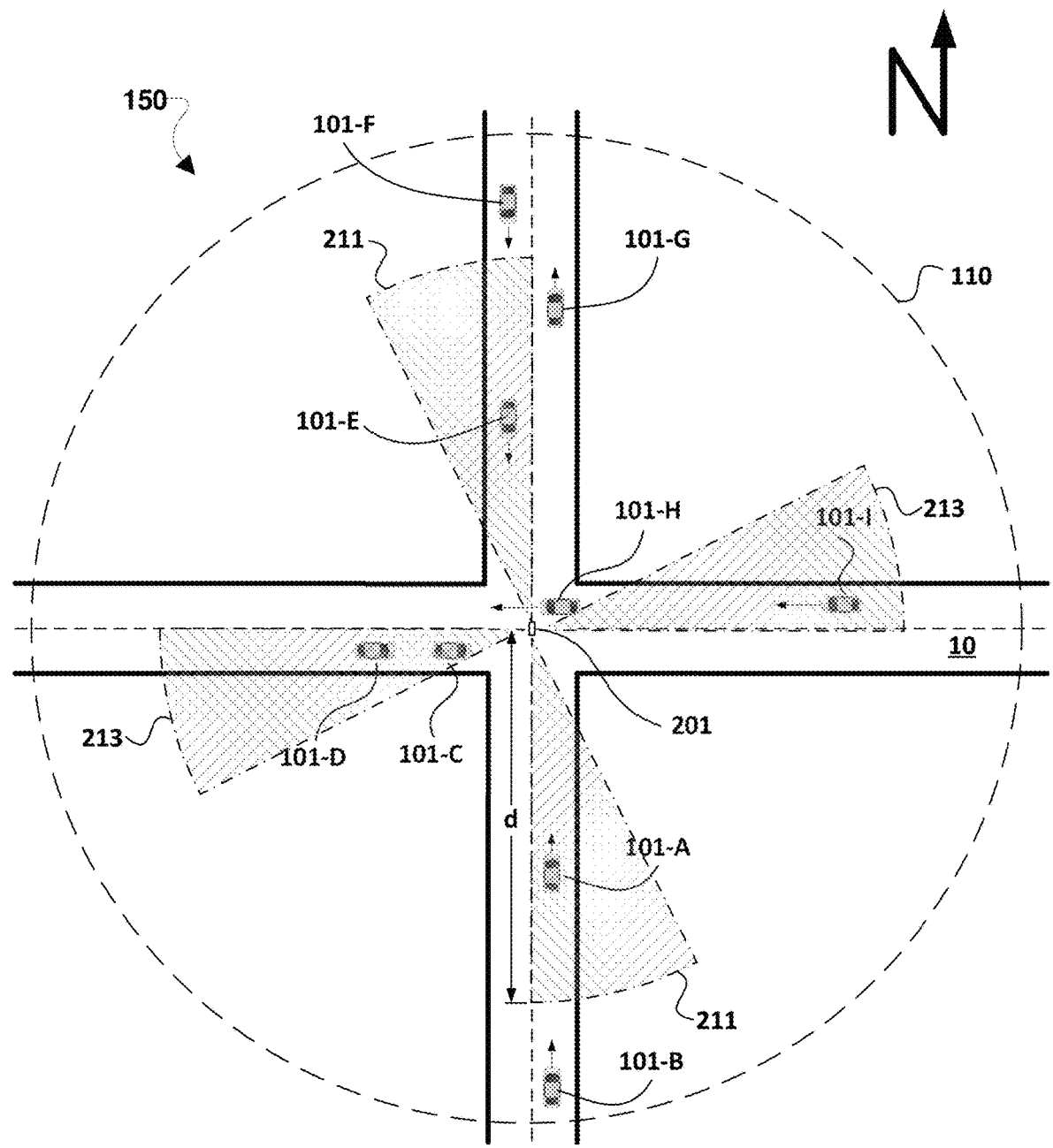
FIG. 1B is a graphical representation of a traffic environment that includes a roadside unit transmitting dynamic directed signaling suitable for implementing various embodiments.

Various embodiments may be implemented within a variety of adaptive traffic management systems and particularly RSUs configured to transmit messages to individual vehicles using dynamic range control and directional signal transmissions. An example adaptive traffic management system 150 is illustrated in FIG. 1B. With reference to FIGS. 1A and 1B, the adaptive traffic management system 150 may include the RSU 201, which in various embodiments may be configured to dynamically determine transmit power and also determine and limit an antenna pointing direction by taking into account to the needs of the vehicles 101-A to 101-I on the nearby roadway 10.

In various embodiments, rather than using an omnidirectional transmissions, the processor of the RSU 201 may use a directional transmission, such as through beam steering, phased arrays, or other techniques. Often, messages only pertain to vehicles in a certain part of a roadway 10 or traveling in a particular direction of the roadway 10. For example, if roadwork is occurring west of the intersection in the westbound lane, only vehicles 101-H and 101-I, and possibly vehicles 101-D and 101-C, will be affected. Similarly, if a traffic light at the intersection is red for the north and southbound lanes, then north and southbound traffic may benefit from SPAT messages to calculate TTG information, while east and westbound traffic may benefit from SPAT messages for calculating TTR information. Thus, the RSU 201 may transmit a first message 211 confined to sectors aimed toward the southbound and northbound lanes only and a separate second message 213 confined to sectors aimed toward the eastbound and westbound lanes only. Alternatively, the RSU 201 may determine, based on the minimum reception distances that only one side of the first message 211 and/or the second message 213 needs to be sent. As a further alternative, the RSU 201 may transmit separate individual messages to each or some of the vehicles 101-A to 101-I on the roadway 10.

In various embodiments, a processor of the RSU 201 may determine a direction from the RSU 201 to a location at which one or more individual vehicles will reliably receive the message at the minimum reception distance. By determining a direction to and location of vehicles that should receive a message, the processor may identify both a transmission power level and a direction to aim or steer the transmission of the message to one or more of the vehicles 101-A to 101-I. Thus, transmitting the message using the determined transmission power level may use a directional transmission of the message in the determined direction.

Figure 2:
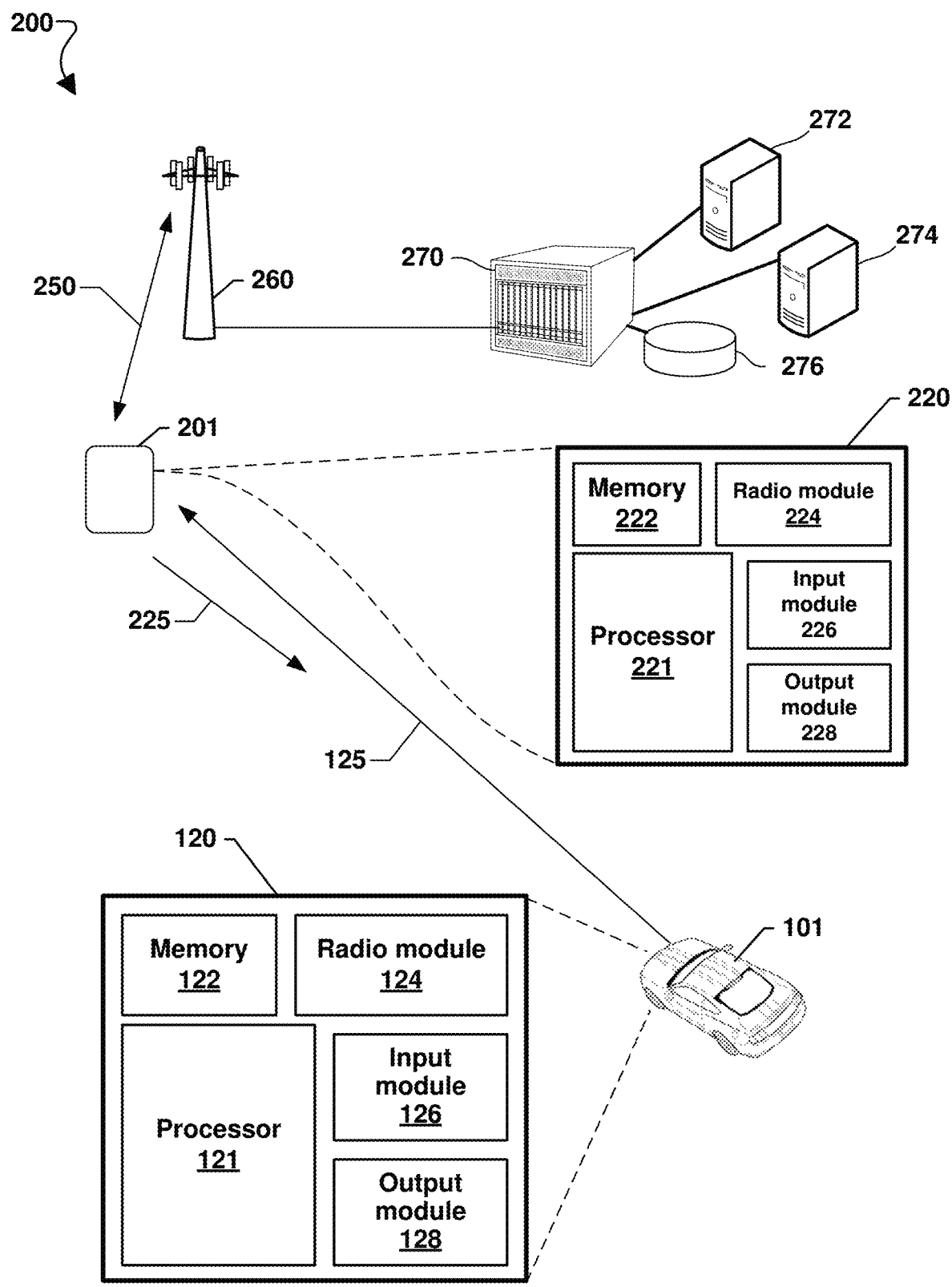
FIG. 2 is a component block diagram illustrating a system configured to perform operations for controlling a message transmission in accordance with various embodiments.

Various embodiments may be implemented within a variety of transportation control systems, an example of which is illustrated in FIG. 2 as transportation control system 200. With reference to FIGS. 1A-2, the transportation control system 200 may include at least one RSU 201 configured to communicate with vehicles, such as the vehicle 101 traveling on a roadway (e.g., 10 in FIGS. 1A-1B).

The RSU 201 may receive V2X messages from the vehicle 101, which may include refined location and state information. In addition, the RSU 201 may receive traffic data, or dynamic traffic control information from various elements of the traffic management infrastructure, such as an adaptive traffic management server 270, roadway sensors, conventional traffic signaling devices, and other ITS elements. Additionally, the RSU 201 may determine, or partially determine, and transmit dynamic traffic control instructions or other V2X messages to the vehicle 101. Further, the RSU 201 may include many of the same features and functions as separate roadway sensors and conventional traffic signaling devices.

The V2X messages may include detailed information associated with the vehicle 101, such as the vehicle specifications (e.g., size, weight, color, etc.), position, speed, acceleration, direction of travel, attitude, orientation, destination, fuel/power level(s), emergency status (e.g., whether the autonomous vehicle is an emergency vehicle or private individual in an emergency), restrictions (e.g., heavy/wide load, turning restrictions, high occupancy vehicle (HOV) authorization, etc.), capabilities, (e.g., all-wheel drive, four-wheel drive, snow tires, chains) of the autonomous vehicle, equipment problems (e.g., low tire pressure, weak breaks, etc.), owner/operator travel preferences (e.g., preferred lane, roads, routes, and/or destinations, preference to avoid tolls or highways, preference for the fastest route, etc.), and/or owner/operator identification information.

The adaptive traffic management server 270 may include one or more computing systems configured to provide live adaptive traffic planning and management for one or more roadways, intersections, cites, or regions. For example, the adaptive traffic management server 270 may include one or more separate databases 276, a sign/signal management server 272, and/or a vehicle control server 274, firewalls, and other network infrastructure. The databases 276 may maintain information about roadways, intersections, traffic management infrastructure elements, and other elements of the traffic management network. The sign/signal management server 272 may provide processing and control of the RSU 201 and other traffic management infrastructure. The vehicle control server 274 may provide processing and management of autonomous and semi-autonomous vehicle signaling. The adaptive traffic management server 270 may be connected, via wired or wireless connections, to various elements of traffic management infrastructure through a network using a virtual private network configuration and/or through a direct connection in a dedicated private network. In this way, the adaptive traffic management server 270 may exchange data with (i.e., receiving from and/or transmitting to) roadway sensors, conventional traffic signaling devices, and RSU's (e.g., 201) connected to the adaptive traffic management server 270 via one or more base stations 260 and other telecommunications equipment.

Additionally or alternatively, the RSU 201 may be configured to perform many of the same features and/or functions described above with regard to the adaptive traffic management server 270.

The vehicle 101 may be the same or similar to vehicles 101-A through 101-I described with regard to FIGS. 1A and 1B. The vehicle 101 may include a vehicle control unit 120, which may include various circuits and devices used to control operations thereof. In the example illustrated in FIG. 2, the vehicle control unit 120 includes a processor 121, memory 122, a radio module 124, an input module 126, and an output module 128. The vehicle control unit 120 may be or include a V2X processing device, such as a telematics control unit or on-board unit (TCU/OBU). The control unit 120 may use the radio module 124 of the vehicle 101 to communicate with RSUs 201, other ITS elements, base stations 260, other vehicles, and other external devices. In various embodiments, the vehicle control unit 120 may receive information from a plurality of information sources, such as the RSU 201, as well as an in-vehicle network, infotainment systems, various sensors, various actuators, and the radio module. The input module 126 may receive sensor data from one or more vehicle sensors (e.g., radar systems) as well as electronic signals from other devices or components. Sensors may detect the presence, direction, distance, and/or speed of the vehicle 101, other vehicles, individuals, and/or objects, which sensor data may be received through the input module 126. The output module 128 may be used to activate various components of the vehicle 101, such as drive control components, and/or communicate with the RSU 201, including via the radio module 124. For example, in an autonomous or semi-autonomous vehicle, the drive control components may control physical elements of the vehicle 101 related to maneuvering and navigation thereof, such as the engine, motors, throttles, directing elements, braking or deceleration elements, and the like. The drive control components may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The RSU 201 may include an RSU control unit 220, which may include various circuits and devices used to control operations thereof. In the example illustrated in FIG. 2, the RSU control unit 220 includes a processor 221, memory 222, an input module 226, and an output module 228. In addition, the RSU control unit 220 may be coupled to a radio module 224 for transmitting and/or receiving wireless communications, which enable the RSU 201 to communicate with vehicles (e.g., vehicle 101), other RSUs, and other ITS elements such as base stations 260 and other external devices. In this way, the RSU 201 may relay messages between vehicles or between a vehicle and ITS elements. The input module 226 of the RSU 201 may receive ITS messaging information, such as from the base station 250 intended to be communicated to vehicles, such as warnings, advisories, information, and other messages. In addition, the input module 226 may be used to receive sensor data and/or other inputs useful for generating and transmitting messages. The output module 128 may be used to communicate with or activate various components of the vehicle 101 and/or the RSU 201, including the radio modules 224, sensor(s), displays, lights, audio systems, etc.

While the RSU 201 is described as including separate components, in some embodiments some or all of the components (e.g., the processor 221, the memory 222, the radio module 224, the input module 226, and/or the output module 228) may be integrated in a single device or module, such as a system-on-chip (SOC) processing device. Such an SOC processing device may be configured for use in vehicles and be configured, such as with processor-executable instructions executing in the processor 221, to perform operations of various embodiments.

FIG. 2 illustrates the vehicle 101 transmitting a V2X message (e.g., a BSM or CAM), using a wireless communication link 125, to the RSU 201, which V2X message the RSU 201 may use to dynamically adjust a power level for message transmissions. In this way, using a dynamically adjusted transmission power level, the RSU 201 may transmit or broadcast a message using a dynamically controlled communication link 225 to the vehicle 101. In some embodiments, the wireless communication links 125, 225 may be bidirectional or unidirectional communication links, and may use one or more communication protocols.

Figure 3:
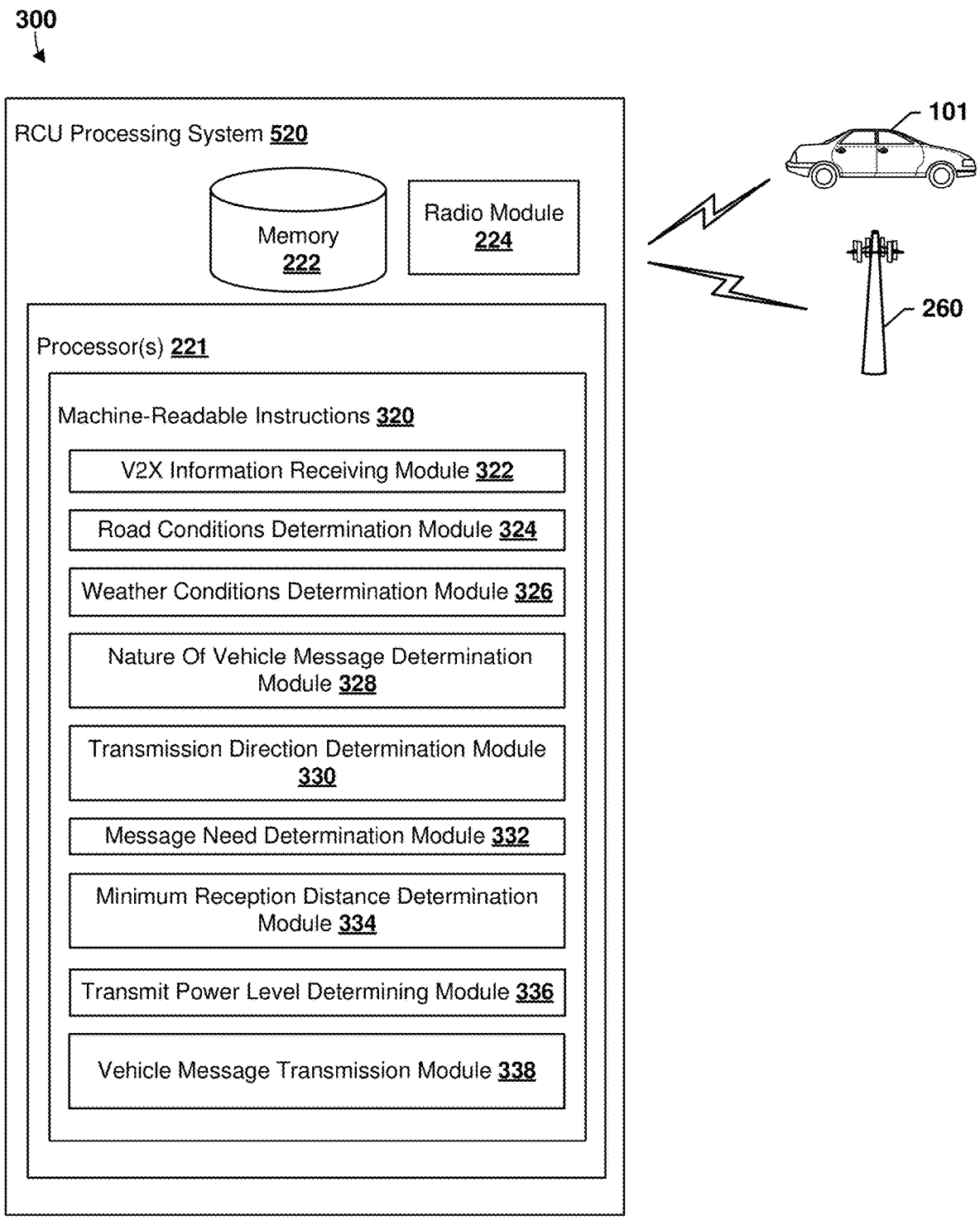
FIG. 3 is a component block diagram illustrating a system configured to perform operations for controlling a message transmission in accordance with various embodiments.

FIG. 3 is a component block diagram illustrating a system 300 configured to perform operations for controlling a message transmission in accordance with various embodiments. With reference to FIGS. 1A-3, the system 300 may include an RSU control unit 220, vehicle(s) 101, and/or base station 260.

The RSU control unit 220 may include one or more processors 221, memory 222, a radio module 224, and other components. The RSU control unit 220 may include a plurality of hardware, software, and/or firmware components operating together to provide the functionality attributed herein to the processor 221.

The memory 222 may include non-transitory storage media that electronically stores information. The electronic storage media that is the memory 222 may include system storage that is provided integrally (i.e., substantially non-removable) with the RSU control unit 220 and/or removable storage that is removably connectable to the RSU control unit 220 via, for example, a port (e.g., a universal serial bus (USB) port, a firewire port, etc.) or a drive (e.g., a disk drive, etc.). In various embodiments, memory 222 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. The memory 222 may include one or more virtual storage resources (e.g., cloud storage, a virtual private network, and/or other virtual storage resources). The memory 222 may store software algorithms, information determined by processor(s) 221, information received from the vehicle 101, information received from other roadside units, information received from the base station 224, and/or other information that enables the RSU control unit 220 to function as described herein.

The processor(s) 221 may include one of more local processors that may be configured to provide information processing capabilities in the RSU control unit 220. As such, the processor(s) 221 may include one or more of a digital processor, an analog processor, a digital circuit designed to process information, an analog circuit designed to process information, a state machine, and/or other mechanisms for electronically processing information. Although the processor(s) 221 is shown in FIG. 3 as a single entity, this is for illustrative purposes only. In some embodiments, the processor(s) 221 may include a plurality of processing units. These processing units may be physically located within the same device, or the processor(s) 221 may represent processing functionality of a plurality of devices operating in coordination.

The RSU control unit 220 may be configured by machine-readable instructions 320, which may include one or more instruction modules. The instruction modules may include computer program modules. In various embodiments, the instruction modules may include one or more of a V2X information receiving module 322, a road conditions determination module 324, a weather conditions determination module 326, a nature of message determination module 328, a transmission direction determination module 330, a message need determination module 332, a minimum reception distance determination module 334, a transmit power level determining module 336, a message transmission module 338, and/or other modules.

The V2X information receiving module 322 may be configured to receive V2X information from a vehicle (e.g., 101). The received V2X information may include refined location and state information received from the vehicle, another roadside unit, an adaptive traffic management server (e.g., 270), roadway sensors, conventional traffic signaling devices, and/or other ITS elements.

The road conditions determination module 324 may be configured to determine an extent to which road conditions are likely to affect the minimum reception distance, wherein determining the minimum reception distance takes into account the determined extent to which road conditions are likely to affect the minimum reception distance. The road conditions determination module 324 may receive road condition information from maps, vehicles (e.g., 101), another roadside unit, an adaptive traffic management server (e.g., 270), roadway sensors, and/or other ITS elements. The road condition may reflect whether the roadway is providing impaired traction control, such as slippery roads or roads with small loose debris, or includes other obstructions or hazards. For example, a pot hole that needs to be avoided, a danger curve.

The weather conditions determination module 326 may be configured to determine an extent to which weather conditions are likely to affect the minimum reception distance, wherein determining the minimum reception distance takes into account the determined extent to which road conditions are likely to affect the minimum reception distance. The weather conditions determination module may receive weather condition information from weather stations, vehicles (e.g., 101), another roadside unit, an adaptive traffic management server (e.g., 270), roadway sensors, and/or other ITS elements.

The nature of message determination module 328 may be configured to determine an extent to which a nature of the message is likely to affect the minimum reception distance, in which determining the minimum reception distance takes into account the determined extent to which the nature of the message is likely to affect the minimum reception distance. In some embodiments, the nature of message determination module 328 may use a lookup table for determining the nature of the message. In some embodiments, the nature of message determination module may receive message nature information from another roadside unit, an adaptive traffic management server (e.g., 270), and/or other ITS elements.

The transmission direction determination module 330 may be configured to determine a direction from the RSU to a location at which the vehicle will reliably receive the message at the minimum reception distance, wherein transmitting the message using the determined transmission power level uses a directional transmission of the message in the determined direction. The transmission direction determination module 330 may determine the transmission direction from the determined direction from the RSU to the location at which the vehicle will reliably receive the message at the minimum reception distance. Using the refined location and state information about the vehicle from the received V2X information, the transmission direction determination module 330 may determine the location at which the vehicle will reliably receive the message at the minimum reception distance. That location will define a vector for message transmissions, which may be used by the RSU to define the appropriate transmission direction.

The message need determination module 332 may be configured to determine whether the vehicle is supposed to receive the message, wherein the determined transmission power level is a lowest available transmission power level in response to determining that the vehicle is not supposed to receive the message. In some embodiments, the lowest available transmission power level may be a zero state, which means no message is transmitted. In some embodiments, the minimum determined transmission power level may be greater zero and at least conserve some power.

The minimum reception distance determination module 334 may be configured to determine, based on the received V2X information, a minimum reception distance at which the vehicle or operator of the vehicle will reliably receive a message from the RSU and have time for the vehicle to react to the message. The minimum reception distance determination module 334 may use combined information from the V2X information receiving module 322, the road conditions determination module 324, the weather conditions determination module 326, the nature of message determination module 328, the transmission direction determination module 330, and the message need determination module 332 to determine the minimum reception distance for message transmission.

The transmit power level determining module 336 may be configured to determine a transmission power level based on the determined minimum reception distance. The transmit power level determining module 336 may use a lookup table, database, or other system for translating the determined minimum reception distances for different messages to respective power level for those messages.

The message transmission module 338 may be configured to transmit the message using the determined transmission power level for the vehicle to receive. The message may be transmitted as an omni-directional transmission message. Alternatively, the message may be transmitted in the direction determined by the transmission direction determination module 330. The message transmission module 338 may use the radio module 224 to transmit the messages.

The processor(s) 221 may be configured to execute the modules 322-338 and/or other modules by software, hardware, firmware, some combination of software, hardware, and/or firmware, and/or other mechanisms for configuring processing capabilities on processor(s) 221.

The description of the functionality provided by the different modules 322-338 is for illustrative purposes, and is not intended to be limiting, as any of modules 322-338 may provide more or less functionality than is described. For example, one or more of modules 322-338 may be eliminated, and some or all of its functionality may be provided by other ones of modules 322-338. As another example, processor(s) 221 may be configured to execute one or more additional modules that may perform some or all of the functionality attributed below to one of modules 322-338.

Figure 4A:
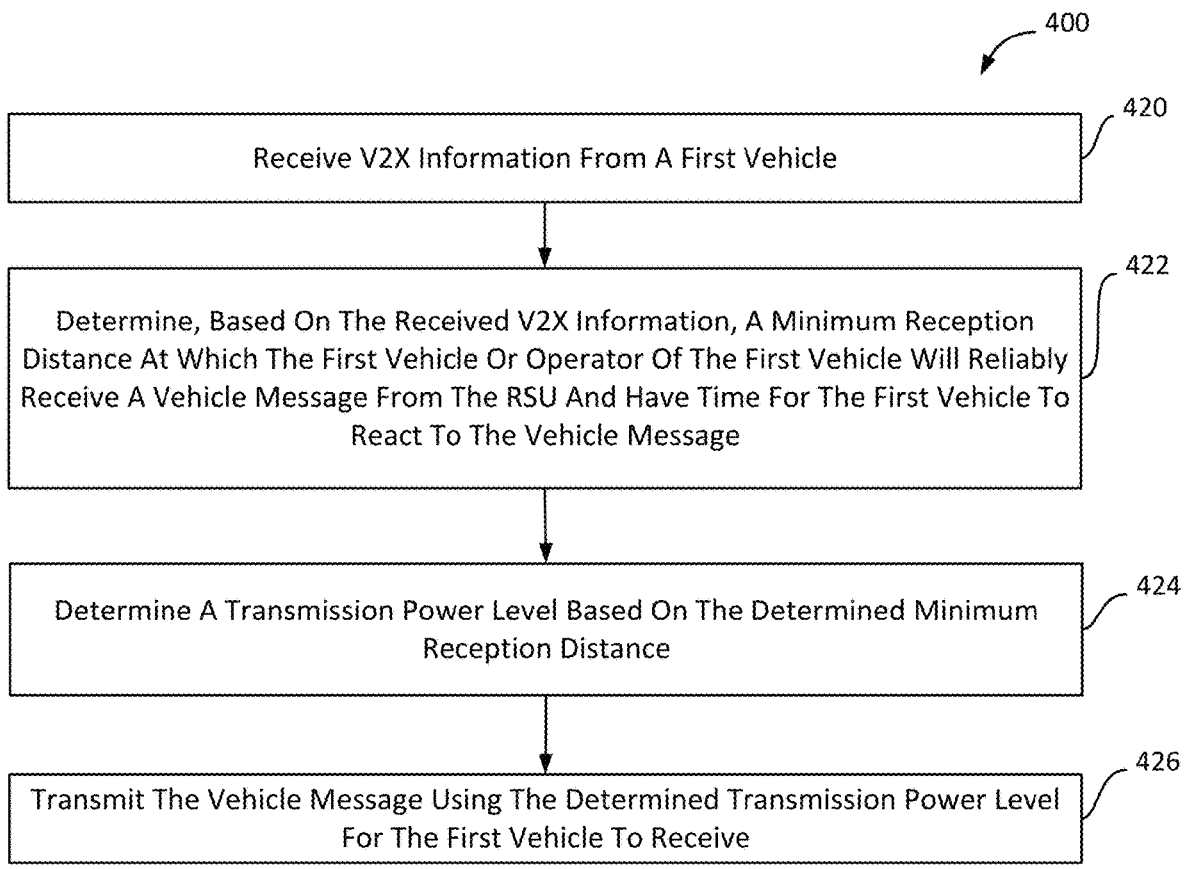
FIG. 4A is a process flow diagram of an example method for controlling a message transmission in accordance with various embodiments.

FIG. 4A is a process flow diagram of an example method 400 for controlling a message transmission in accordance with various embodiments. With reference to FIGS. 1A-4A, the operations 420-426 of the method 400 may be performed by an RSU processing system or RSU processor (such as the RSU control unit 220, RSU control unit 220, and/or the processor 221 that may be implemented in hardware elements, software elements, or a combination of hardware and software elements (hereinafter referred to collectively as a "RSU processing system").

In block 420, the RSU processing system may receive V2X information from a vehicle. For example, the RSU processing system of an RSU (e.g., 201) may receive V2X information from a vehicle (e.g., 101). Means for performing the operations of block 420 may include the RSU processing systems (e.g., 220, 221, 520), the vehicle control unit (e.g., 120), the radio modules 124, 224, the processor(s) 221, and the V2X information receiving module 322.

In block 422, the RSU processing system may determine, based on the received V2X information, a minimum reception distance at which the vehicle or operator of the vehicle will reliably receive a message from the RSU and have time for the vehicle to react to the message. In some embodiments, the RSU processing system may determine the minimum reception distance based on the vehicle's speed and trajectory determined from vehicle state information. Means for performing the operations of block 422 may include the RSU processing systems (e.g., 220, 221, 520), the vehicle control unit (e.g., 120), and the processor(s) 221, and the minimum reception distance determination module 334.

In block 424, the RSU processing system may determine a transmission power level based on the determined minimum reception distance. In some embodiments, the RSU processing system may determine a low transmission power level for low-priority messages or messages that are either optional for vehicles or do not require a great deal of reaction time. Means for performing the operations of block 422 may include the RSU processing systems (e.g., 220, 221, 520), the vehicle control unit (e.g., 120), and the processor(s) 221, and the transmission power level determining module 336.

In block 426, the RSU processing system may transmit the message to the vehicle using the determined transmission power level. In some embodiments, the RSU processing system may use the radio module (e.g., 224) to transmit the message, such that the vehicle may receive the message much later in time than when the RSU processing system received the V2X information. In some embodiments, for high risk or important messages, the vehicle may receive the message almost immediately following receipt by the RSU processing system of the V2X information in block 426. In some embodiments, RSU may use an omni-directional transmission of the message when transmitting the message using the determined transmission power level in block 426. In some embodiments, RSU may use a directional transmission of the message when transmitting the message using the determined transmission power level in block 426. Means for performing the operations of block 420 may include the RSU processing systems (e.g., 220, 221, 520), the vehicle control unit (e.g., 120), the radio modules 124, 224, the processor(s) 221, and the V2X information receiving module 322.

FIGS. 4B-4F are process flow diagrams of example operations 428-436 that may be performed as part of the method 400 for controlling a message transmission in accordance with various embodiments. The operations 428-436 may be performed by an RSU processing system or RSU processor (such as the RSU control unit 220, RSU control unit 220, and/or the processor 221 that may be implemented in hardware elements, software elements, or a combination of hardware and software elements (hereinafter referred to collectively as a "RSU processing system").

Figure 4B:
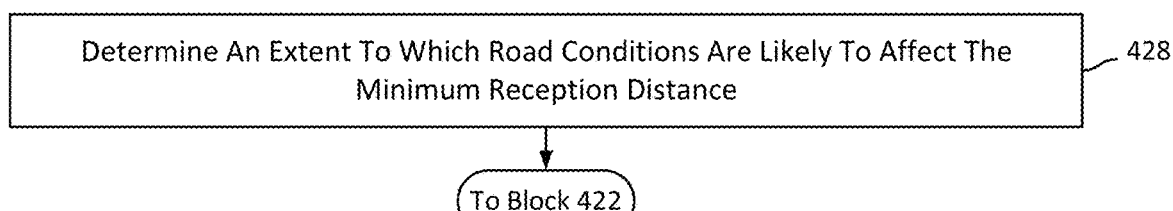
FIGS. 4B-4F are process flow diagrams of example operations that may be performed as part of the method for controlling a message transmission illustrated in FIG. 4A in accordance with some embodiments.

FIG. 4B illustrates operations 428 of the method 402 that may be performed by the RSU processing system in accordance with some embodiments. With reference to FIGS. 1A-4B, in block 428 the RSU processing system may determine an extent to which road conditions (e.g., asphalt, concrete, gravel, wet or dry, ice, snow, etc.) are likely to affect the minimum reception distance. For example, the RSU processing system may determine that the subject roadway is slippery from gravel, ice, precipitation or other conditions, which may increase vehicle stopping distances at various speeds, and thus warrant increasing the message transmission power so that RSU messages are received at greater distances. As another example, the RSU processing system may determine that the subject roadway is dry and clear asphalt on which vehicle stopping distances will be at their greatest, and thus warrant decreasing the message transmission power so that RSU messages are not received at distances beyond which the information is relevant to vehicles under such roadway conditions. Means for performing the operations of block 428 may include the RSU processing systems (e.g., 220, 221, 520).

Following the operations in block 428, the RSU processing system may determine a minimum reception distance at which the vehicle or operator of the vehicle will reliably receive a message from the RSU and have time for the vehicle to react to the message transmitted in block 422 of the method 400 as described. In block 422, the RSU may determine the minimum reception distance by taking into account the determined extent to which road conditions are likely to affect the minimum reception distance.

Figure 4C:
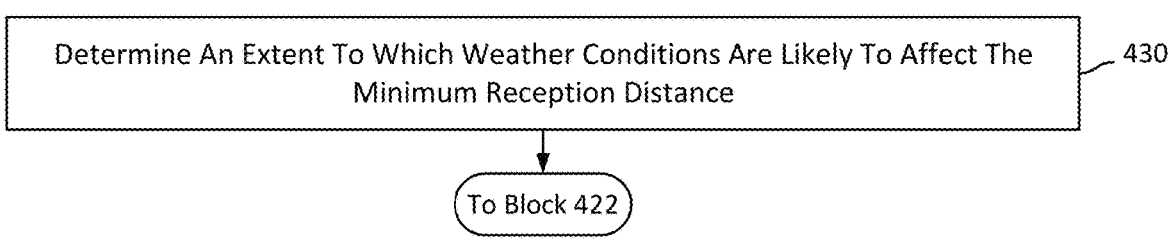

FIG. 4C illustrates operations 430 of the method 403 that may be performed by the RSU processing system in accordance with some embodiments. With reference to FIGS. 1A-4C, in block 430 the RSU processing system may determine an extent to which weather conditions (e.g., fog, rain, snow, ice, etc.) are likely to affect the minimum reception distance. For example, the RSU processing system may determine that the weather may increase the attenuation of wireless transmissions, and/or increase the stopping distance of vehicles, thereby requiring more reaction time from the vehicle or the driver of the vehicle, which may warrant increasing the message transmission power. Means for performing the operations of block 430 may include the RSU processing systems (e.g., 220, 221, 520).

Following the operations in block 430, the RSU processing system may determine a minimum reception distance at which the vehicle or operator of the vehicle will reliably receive a message from the RSU and have time for the vehicle to react to the message in block 422 of the method 400 as described. Thus, the operations in block 430 enable the RSU to determine the minimum reception distance taking into account the determined extent to which weather conditions are likely to affect the minimum stopping distance of vehicles at various speeds as well as cause attenuation of wireless signals.

Figure 4D:
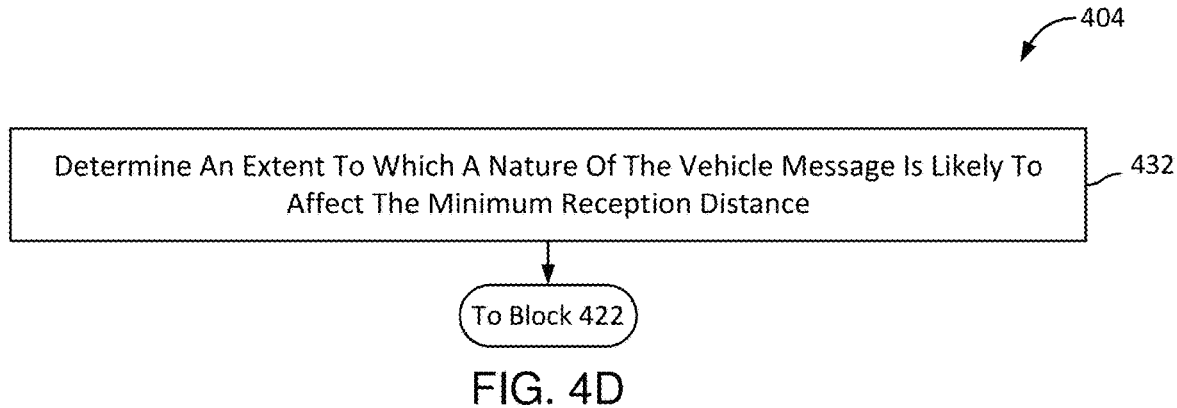

FIG. 4D illustrates operations 432 of the method 404 that may be performed by the RSU processing system in accordance with some embodiments. With reference to FIGS. 1A-4D, in block 432 the RSU processing system may determine an extent to which a nature of the message is likely to affect the minimum reception distance. For example, the RSU processing system may determine that the message contains low-priority information, which may warrant decreasing the message transmission power. Alternatively, the RSU processing system may determine that the message contains high-priority information, such as information requiring the vehicle or the driver to take an immediate action, which may warrant increasing the message transmission power. Means for performing the operations of block 428 may include the RSU processing systems (e.g., 220, 221, 520).

Following the operations in block 432, the RSU processing system may determine a minimum reception distance at which the vehicle or operator of the vehicle will reliably receive a message from the RSU and have time for the vehicle to react to the message in block 422 of the method 400 as described. In block 422 determining the minimum reception distance may take into account the determined extent to which the nature of the message is likely to affect the minimum reception distance. Means for performing the operations of block 422 may include the RSU processing systems (e.g., 220, 221, 520), the vehicle control unit (e.g., 120), and the processor(s) 221, and the nature of message determination module 326.

Figure 4E:
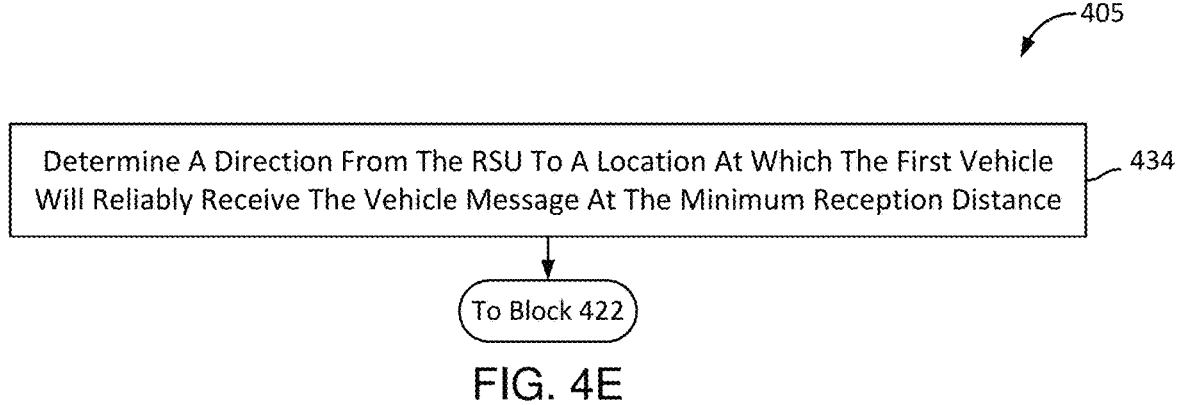

FIG. 4E illustrates operations 434 of the method 405 that may be performed by the RSU processing system in accordance with some embodiments. With reference to FIGS. 1A-4E, in block 434 the RSU processing system may determine a direction from the RSU to a location at which the vehicle will reliably receive the message at the minimum reception distance. For example, the RSU processing system may determine only one vehicle needs to receive a particular message, which means the direction of the message transmission should aim at that particular vehicle. In some embodiments, the RSU processing system may determine less than all vehicles within range need to receive a particular message, in which case the RSU may aim the directional message transmission at those vehicles that should receive the message. As a further example, more than one message may be transmitted at or near the same time to different vehicles or groups of vehicles in different directions. Means for performing the operations of block 428 may include the RSU processing systems (e.g., 220, 221, 520).

Following the operations in block 434, the RSU processing system may transmit the message in block 426 of the method 400 as described. In block 426 transmitting the message using the determined transmission power level may use a directional transmission of the message in the determined direction. Means for performing the operations of block 422 may include the RSU processing systems (e.g., 220, 221, 520), the vehicle control unit (e.g., 120), and the processor(s) 221, and the transmission direction determination module 330.

Figure 4F:
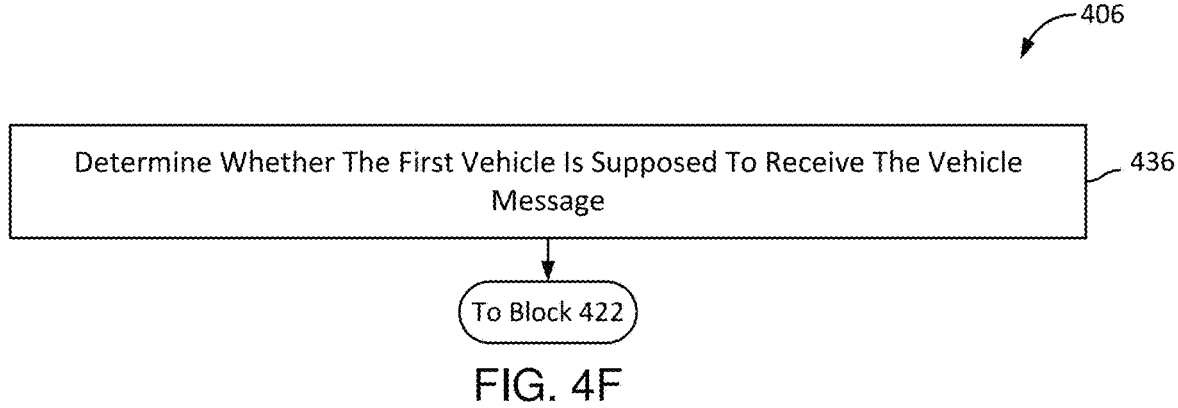

FIG. 4F illustrates operations 436 of the method 406 that may be performed by the RSU processing system in accordance with some embodiments. With reference to FIGS. 1A-4F, in block 436 the RSU processing system may determine whether the vehicle is supposed to receive the message. For example, the RSU processing system may determine a particular message does not pertain to a select vehicle, in which case that select vehicle either need not receive the message or may receive it will little or no time to react thereto. Means for performing the operations of block 436 may include the RSU processing systems (e.g., 220, 221, 520), the vehicle control unit (e.g., 120), and the processor(s) 221, and the message need determination module 332.

Following the operations in block 436, the RSU processing system may determine the transmission power level in block 424 of the method 400 by determining the transmission power level as a lowest available transmission power level in response to determining that the vehicle is not supposed to receive the message.

Figure 5:
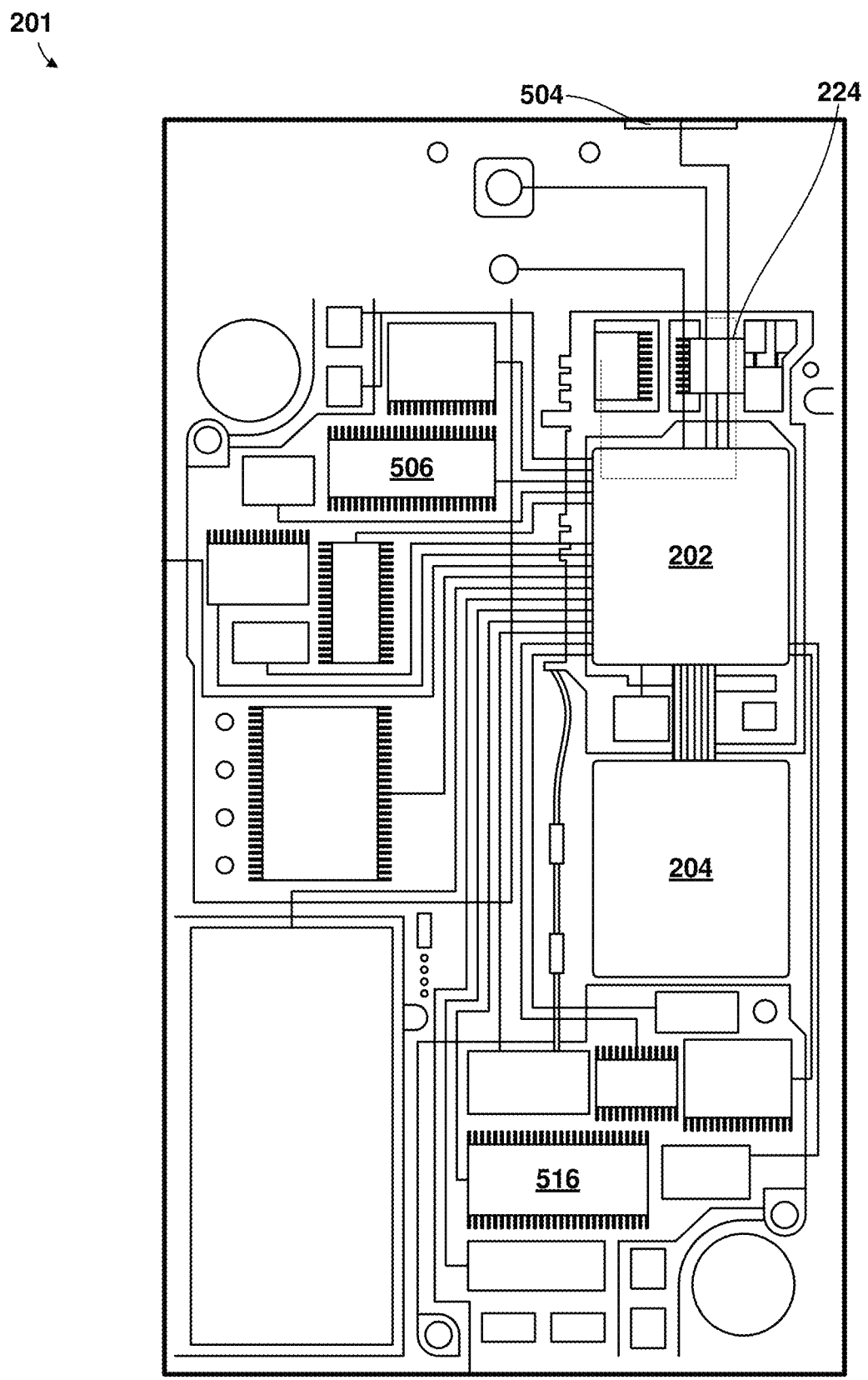
FIG. 5 is a component block diagram of roadside unit suitable for use with various embodiments.

The various aspects (including, but not limited to, embodiments discussed above with reference to FIGS. 1A-4F) may be implemented on a variety of RSUs (e.g., 201), an example of which is illustrated in FIG. 5 in the form of a computing device suitable for use in a network element of an intelligent highway system. With reference to FIGS. 1A-5, the RSU 201 may include a first SoC 202 (e.g., a SoC-CPU) coupled to a second SoC 204 (e.g., a 5G capable SoC) and a third SoC 506 (e.g., a C-V2X SoC configured for managing V2V, V2I, and V2P communications over D2D links, such as D2D links establish in the dedicated ITS 5.9 GHz spectrum communications). The first, second, and/or third SoCs 202, 204, and 506 may be coupled to internal memory 516 and a radio module 224. Additionally, the RSU 201 may include a radio module 224 (e.g., a wireless data link and/or cellular transceiver, etc.) coupled to one or more processors in the first, second, and/or third SoCs 202, 204, and 506. The radio module 224 may be connected to an antenna interface 504 for connecting to a vehicle antenna for sending and receiving electromagnetic radiation.

Implementation examples are described in the following paragraphs. While some of the following implementation examples are described in terms of example methods, further example implementations may include: the example methods discussed in the following paragraphs implemented by a processor of a roadside unit including a processor configured with processor-executable instructions to perform operations of the methods of the following implementation examples; the example methods discussed in the following paragraphs implemented by a roadside unit including means for performing functions of the methods of the following implementation examples; and the example methods discussed in the following paragraphs may be implemented as a non-transitory processor-readable storage medium having stored thereon processor-executable instructions configured to cause a processor of a roadside unit to perform the operations of the methods of the following implementation examples.

Example 1. A method performed by a processor of a roadside unit (RSU) processing system for controlling a message transmission, including: receiving vehicle-to-everything (V2X) information from a vehicle; determining, based on the received V2X information, a minimum reception distance at which the vehicle or operator of the vehicle will reliably receive a message from the RSU and have time for the vehicle to react to the message; determining a transmission power level based on the determined minimum reception distance; and transmitting the message to the vehicle using the determined transmission power level.

Example 2. The method of example 1, further including determining an extent to which road conditions are likely to affect the minimum reception distance, in which determining the minimum reception distance takes into account the determined extent to which road conditions are likely to affect the minimum reception distance.

Example 3. The method of any of examples 1-2, further including determining an extent to which weather conditions are likely to affect the minimum reception distance, in which determining the minimum reception distance takes into account the determined extent to which road conditions are likely to affect the minimum reception distance.

Example 4. The method of any of examples 1-3, further including determining an extent to which a nature of the message is likely to affect the minimum reception distance, in which determining the minimum reception distance takes into account the determined extent to which the nature of the message is likely to affect the minimum reception distance.

Example 5. The method of any of examples 1-4, in which transmitting the message using the determined transmission power level uses an omni-directional transmission of the message.

Example 6. The method of any of examples 1-5, further including determining a direction from the RSU to a location at which the vehicle will reliably receive the message at the minimum reception distance, in which transmitting the message using the determined transmission power level uses a directional transmission of the message in the determined direction.

Example 7. The method of any of examples 1-6, further including determining whether the vehicle is supposed to receive the message, in which the determined transmission power level is a lowest available transmission power level in response to determining that the vehicle is not supposed to receive the message.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a roadside unit (RSU), the method comprising:
   receiving vehicle-to-everything (V2X) information indicating a location, a speed, and a direction of a vehicle;
   determining, based on the location and the direction, that the vehicle is approaching a traffic signal where the RSU is located;
   determining, based on the speed, a first distance from the traffic signal at which a signal phase and timing (SPAT) of the traffic signal is relevant to the vehicle;
   determining a first transmission power level for transmitting a first SPAT message based on the determined first distance; and
   transmitting the first SPAT message to the vehicle using the determined first transmission power level in response to determining that the vehicle is within the first distance.

2. The method of claim 1, further comprising:
- determining, based on the speed, a second distance from the traffic signal, shorter than the first distance from the traffic signal, within which the SPAT of the traffic signal is not relevant to the vehicle;
- determining a second transmission power level, lower than the first transmission power level, for transmitting a second SPAT message based on the determined second distance; and
- transmitting the second SPAT message to the vehicle using the determined second transmission power level in response to determining that the vehicle is within the second distance.

3. The method of claim 2, further comprising determining an extent to which road conditions, weather conditions, or any combination thereof, are likely to affect the second distance,
- wherein determining the second distance takes into account the determined extent to which road conditions, weather conditions, or any combination thereof, are likely to affect the second distance.

4. The method of claim 2, further comprising determining an extent to which a nature of the second SPAT message is likely to affect the second distance,
- wherein determining the second distance takes into account the determined extent to which the nature of the second SPAT message is likely to affect the second distance.

5. The method of claim 1, further comprising:
- determining, based on the speed, a second distance from the traffic signal, shorter than the first distance, within which the SPAT of the traffic signal is not relevant to the vehicle; and
- not transmitting a second SPAT message to the vehicle in response to determining the vehicle is at or closer than the second distance.

6. The method of claim 1, further comprising:
- determining a transmission direction of the first SPAT message based on the location of the vehicle and the determination that the vehicle is approaching the traffic signal,
- wherein transmitting the first SPAT message is in the determined transmission direction.

7. The method of claim 1, further comprising determining whether the vehicle is supposed to receive the first SPAT message,
- wherein the determined first transmission power level is a lowest available transmission power level in response to determining that the vehicle is not supposed to receive the first SPAT message.

8. A roadside unit (RSU), comprising:
- a wireless transceiver system; and
- a processing system coupled to the wireless transceiver system and configured to:
  - receive vehicle-to-everything (V2X) information indicating a location, a speed, and a direction of a vehicle;
  - determine, based on the location and the direction, that the vehicle is approaching a traffic signal where the RSU is located;
  - determine, based on the speed, a first distance from the traffic signal at which a signal phase and timing (SPAT) of the traffic signal is relevant to the vehicle;
  - determine a first transmission power level for transmitting a first SPAT message based on the determined first distance; and
  - transmit the first SPAT message to the vehicle using the determined first transmission power level in response to determining that the vehicle is within the first distance.

9. The roadside unit of claim 8, wherein the processing system is further configured to:
- determine, based on the speed, a second distance from the traffic signal, shorter than the first distance, within which the SPAT of the traffic signal is not relevant to the vehicle;
- determine a second transmission power level, lower than the first transmission power level, for transmitting a second SPAT message based on the determined second distance; and
- transmit the second SPAT message to the vehicle using the determined second transmission power level in response to determining that the vehicle is within the second distance.

10. The roadside unit of claim 9, wherein the processing system is further configured to:
- determine an extent to which road conditions, weather conditions, or any combination thereof, are likely to affect the second distance; and
- determine the second distance taking into account the determined extent to which road conditions, weather conditions, or any combination thereof, are likely to affect the second distance.

11. The roadside unit of claim 9, wherein the processing system is further configured to:
- determine an extent to which a nature of the second SPAT message is likely to affect the second distance; and
- determine the second distance taking into account the determined extent to which the nature of the second SPAT message is likely to affect the second distance.

12. The roadside unit of claim 8, wherein the processing system is further configured to;
- determine, based on the speed, a second distance from the traffic signal, shorter than the first distance, within which the SPAT of the traffic signal is not relevant to the vehicle; and
- not transmit a second SPAT the message to the vehicle in response to determining the vehicle is at or closer than the second distance.

13. The roadside unit of claim 8, wherein the processing system is further configured to:
- determine a transmission direction of the first SPAT message based on the location of the vehicle and the determination that the vehicle is approaching the traffic signal,
- transmit the first SPAT message in the determined transmission direction.

14. The roadside unit of claim 8, wherein the processing system is further configured to:
- determine whether the vehicle is supposed to receive the first SPAT message; and
- transmit the first SPAT message at a lowest available transmission power level in response to determining that the vehicle is not supposed to receive the first SPAT message.

15. A roadside unit (RSU), comprising:
- means for receiving vehicle-to-everything (V2X) information indicating a location, a speed, and a direction of a vehicle;
- means for determining, based on the location and the direction, that the vehicle is approaching a traffic signal where the RSU is located;

means for determining, based on the speed, a first distance from the traffic signal at which a signal phase and timing (SPAT) of the traffic signal is relevant to the vehicle;

means for determining a first transmission power level for transmitting a first SPAT message based on the determined first distance; and means for transmitting the first SPAT message to the vehicle using the determined first transmission power level in response to determining that the vehicle is within the first distance.

16. The roadside unit of claim 15, further comprising:
means for determining, based on the speed, a second distance from the traffic signal, shorter than the first distance, within which the SPAT of the traffic signal is not relevant to the vehicle;

means for determining a second transmission power level, lower than the first transmission power level, for transmitting a second SPAT message based on the determined second distance; and means for transmitting the second SPAT message to the vehicle using the determined second transmission power level in response to determining that the vehicle is within the second distance.

17. The roadside unit of claim 16, further comprising means for determining an extent to which road conditions, weather conditions, or any combination thereof, are likely to affect the second distance,
wherein means for determining the second distance comprises means for determining the second distance taking into account the determined extent to which road conditions, weather conditions, or any combination thereof, are likely to affect the second distance.

18. The roadside unit of claim 16, further comprising means for determining an extent to which a nature of the second SPAT message is likely to affect the second distance,
wherein means for determining the second distance comprises means for determining the second distance taking into account the determined extent to which the nature of the second SPAT message is likely to affect the second distance.

19. The roadside unit of claim 15, further comprising:
means for determining, based on the speed, a second distance from the traffic signal, shorter than the first distance, within which the SPAT of the traffic signal is not relevant to the vehicle; and
means for not transmitting a second SPAT message to the vehicle in response to determining the vehicle is at or closer than the second distance.

20. The roadside unit of claim 15, further comprising:
means for determining a transmission direction of the first SPAT message based on the location of the vehicle and the determination that the vehicle is approaching the traffic signal,
means for transmitting the first SPAT message in the determined transmission direction.

21. The roadside unit of claim 15, further comprising means for determining whether the vehicle is supposed to receive the first SPAT message,
wherein means for determining the first transmission power level comprises means for determining the first transmission power level as a lowest available transmission power level in response to determining that the vehicle is not supposed to receive the first SPAT message.

22. A non-transitory processor-readable medium having stored thereon processor-executable instructions configured to cause a processor of a roadside unit (RSU) to perform operations comprising:
receiving vehicle-to-everything (V2X) information indicating a location, a speed, and a direction of a vehicle;
determining, based on the location and the direction, that the vehicle is approaching a traffic signal where the RSU is located;
determining, based on the speed, a first distance from the traffic signal at which a signal phase and timing (SPAT) of the traffic signal is relevant to the vehicle;
determining a first transmission power level for transmitting a first SPAT message based on the determined first distance;
transmitting the first SPAT message to the vehicle using the determined first transmission power level in response to determining that the vehicle is within the first distance.

23. The non-transitory processor-readable medium of claim 22, wherein the stored processor-executable instructions are configured to cause the processor of the roadside unit to perform operations further comprising:
determining, based on the speed, a second distance from the traffic signal, shorter than the first distance, within which the SPAT of the traffic signal is not relevant to the vehicle;
determining a second transmission power level, lower than the first transmission power level, for transmitting a second SPAT message based on the determined second distance; and
transmitting the second SPAT message to the vehicle using the determined second transmission power level in response to determining that the vehicle is within the second distance.

24. The non-transitory processor-readable medium of claim 23, wherein the stored processor-executable instructions are configured to cause the processor of the roadside unit to perform operations further comprising determining an extent to which road conditions, weather conditions, or any combination thereof, are likely to affect the second distance,
wherein the stored processor-executable instructions are configured to cause the processor of the roadside unit to perform operations such that determining the second distance takes into account the determined extent to which road conditions, weather conditions, or any combination thereof, are likely to affect the second distance.

25. The non-transitory processor-readable medium of claim 23, wherein the stored processor-executable instructions are configured to cause the processor of the roadside unit to perform operations further comprising determining an extent to which a nature of the second SPAT message is likely to affect the second distance,
wherein the stored processor-executable instructions are configured to cause the processor of the roadside unit to perform operations such that determining the second distance takes into account the determined extent to which the nature of the second SPAT message is likely to affect the second distance.

26. The non-transitory processor-readable medium of claim 22, wherein the stored processor-executable instructions are configured to cause the processor of the roadside unit to perform operations further comprising:

determining, based on the speed, a second distance from the traffic signal, shorter than the first distance, within which the SPAT of the traffic signal is not relevant to the vehicle;

not transmitting a second SPAT message to the vehicle in response to determining the vehicle is at or closer than the second distance.

27. The non-transitory processor-readable medium of claim 22, wherein the stored processor-executable instructions are configured to cause the processor of the roadside unit to perform operations further comprising:

determining a transmission direction of the first SPAT message based on the location of the vehicle and the determination that the vehicle is approaching the traffic signal; and transmitting the first SPAT message in the determined transmission direction.

28. The non-transitory processor-readable medium of claim 22, wherein the stored processor-executable instructions are configured to cause the processor of the roadside unit to perform operations further comprising determining whether the vehicle is supposed to receive the first SPAT message, wherein the stored processor-executable instructions are configured to cause the processor of the roadside unit to perform operations such that the determined first transmission power level is a lowest available transmission power level in response to determining that the vehicle is not supposed to receive the first SPAT message.

* * * * *